US 8,756,331 B2

(12) United States Patent
Moughler et al.

(10) Patent No.: US 8,756,331 B2
(45) Date of Patent: Jun. 17, 2014

(54) QOS-BASED COMMUNICATIONS ON A WORK MACHINE

(75) Inventors: Eric A. Moughler, Metamora, IL (US); Keith A. Turcot, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 2089 days.

(21) Appl. No.: 11/311,279

(22) Filed: Dec. 20, 2005

(65) Prior Publication Data

US 2007/0142990 A1  Jun. 21, 2007

(51) Int. Cl.
*G06F 15/16* (2006.01)
*H04L 12/56* (2006.01)
*H04L 12/14* (2006.01)

(52) U.S. Cl.
CPC ............... *H04L 47/10* (2013.01); *H04L 12/14* (2013.01); *H04L 12/1485* (2013.01)
USPC ........................................ 709/231; 709/232

(58) Field of Classification Search
CPC ......... H04L 47/10; H04L 69/22; H04L 29/06; H04L 12/14; H04L 12/1485; H04L 45/00; H04L 45/30; H04L 45/583; H04L 47/22; H04L 47/2416; H04L 69/12; H04L 69/163; H04L 12/4633; H04L 12/5695; H04L 47/04
USPC ........................................................ 709/230
See application file for complete search history.

(56) References Cited

U.S. PATENT DOCUMENTS

| 6,349,252 | B1 | 2/2002 | Imanishi et al. | |
| 6,744,352 | B2 | 6/2004 | Lesesky et al. | |
| 7,593,999 | B2 * | 9/2009 | Nathanson | 709/217 |
| 7,720,581 | B2 * | 5/2010 | Yaqub | 701/33 |
| 2002/0116107 | A1 | 8/2002 | Mahoney et al. | |
| 2002/0156558 | A1 | 10/2002 | Hanson et al. | |
| 2003/0067903 | A1 * | 4/2003 | Jorgensen | 370/338 |
| 2003/0115331 | A1 * | 6/2003 | Xie et al. | 709/227 |
| 2004/0042444 | A1 * | 3/2004 | Edmon et al. | 370/352 |
| 2004/0207514 | A1 * | 10/2004 | Lesesky et al. | 340/431 |
| 2004/0228273 | A1 * | 11/2004 | Kurobe et al. | 370/229 |
| 2005/0002354 | A1 | 1/2005 | Kelly et al. | |
| 2005/0004735 | A1 | 1/2005 | Kelly et al. | |
| 2005/0021860 | A1 | 1/2005 | Kelly et al. | |
| 2007/0091897 | A1 * | 4/2007 | Lee et al. | 370/395.5 |
| 2007/0244614 | A1 * | 10/2007 | Nathanson | 701/35 |
| 2009/0067328 | A1 * | 3/2009 | Morris et al. | 370/230.1 |
| 2010/0103819 | A1 * | 4/2010 | Samuels et al. | 370/235 |

* cited by examiner

*Primary Examiner* — Karen Tang
(74) *Attorney, Agent, or Firm* — Finnegan, Henderson, Farabow, Garrett & Dunner LLP

(57) ABSTRACT

A system to provide reliable and secure communication between a work machine and one or more remote entities using a communication network may include a work machine controller configured to control at least one operation of a work machine. The system may also include a gateway device operably connected to the work machine controller and a communication network, the gateway device being configured to receive data from the work machine controller. The gateway device may also be configured to add quality of service information to the received data. The gateway device may also be configured to transmit, based on the added quality of service information, the received data with the added quality of service information to the communication network.

26 Claims, 4 Drawing Sheets

QOS-BASED COMMUNICATIONS ON A WORK MACHINE

TECHNICAL FIELD

The present disclosure is related to a system and method for secure and reliable communications between a work machine and entities located remotely from the work machine, and, more particularly, to a system and method for communications between a work machine and remote entities using a communication network.

BACKGROUND

A machine operating at a work site may need the ability to communicate with remote entities, such as, for example, other machines, remote devices, and remote stations. This may be due to various reasons. One reason may be that a number of machines may operate in tandem at a work site. The machines may operate in such a manner because a task performed by one machine may be related to the task performed by another. Therefore, an operator of one machine at a work site may need to be aware of the operations of another machine. For example, a machine that operates as a loader at a work site may only begin its operation of loading the excavated material at a work site after another machine that operates as an excavator has completed its task of excavating the material from the work site. It would be advantageous for the loader and the excavator to be in communication with each other in order to ensure the efficacy of operations at a work site. In addition, machines operating at different work sites or even the same work site may need to communicate other information to each other such as position information, loading information, etc.

It may also be advantageous for machines operating at work sites to exchange information with remote stations, such as, for example, base stations, monitoring stations, etc. This information may include, for example, operating instructions, software upgrades for machine components, status of machine components, etc. In some instances, the remote station may be located at the work site of a machine. Alternatively, the remote station may be located away from the work site of the machine. Thus, there exists a need for communication between machines at the same or different work sites and also between machines and remote stations.

Due to the number of machines operating at work sites and also due to the large distances that may exist between machines and remote stations, it may not be feasible to connect each machine to the other and/or to the remote stations (i.e., in a mesh formation) by using a separate physical connection between each machine and a remote station. Instead, it may be desirable to connect the machines and remote stations to each other using a communication network. In some instances, the users and manufacturers of machines operating at a work site may not own a communication network of their own. In such instances, there may be a need to leverage a third-party communication network, i.e., a communication network owned and operated by an entity other than the user and manufacturer of the machines and remote stations.

To remedy the problem of providing communications between a machine and remote entities, many solutions have been proposed that involve the use of communication networks. One related system and method is described in U.S. Patent Application No. 2004/0207514 by Lesesky et al. ("the '514 application") that published on Oct. 21, 2004. The '514 application discloses a system for data communications with a vehicle. Specifically, the '514 application discloses a vehicle data communications protocol converter that may be used to convert a first data communications protocol associated with the data generated from components in the vehicle to a second data communications protocol associated with an infrared communications protocol, a radio frequency ("RF") data communications protocol, an Internet data network protocol, and other such protocols. The system also includes a transceiver that connects to the vehicle data communications protocol converter to transmit the data communications protocol from the vehicle to a remote data communications terminal and receive the data communications protocol from the remote data communications terminal.

While the system of the '514 publication may provide for communication between a vehicle and a remote terminal using a communication network, it has several shortcomings. For example, the system of the '514 publication does not allow for adding transmission information that may help prioritize the transmission of time-sensitive information over information sent with lower priority. The system of the '514 publication also does not provide for the use of transmission information to exchange information over the communication network as per quality of service criteria. For example, the nature of some information may require the delivery of information by reliable means using delivery mechanisms that may include, for example, acknowledgements, for messages delivered. The system of the '514 publication does not ensure the reliable delivery of such information.

Additionally, the system of the '514 publication does not provide for the encryption of information exchanged between a machine and remote entities. The system of the '514 publication also does not include a firewall for components on board the machine from certain data, such as, corrupt data, unwanted data, viruses, etc., that may traverse through the communication network.

The present disclosure is directed to overcoming one or more of the problems of the prior art vehicle data communication system.

SUMMARY OF THE INVENTION

In an exemplary embodiment, a system to provide reliable and secure communication between a work machine and one or more remote entities using a communication network may include a work machine controller configured to control at least one operation of a work machine. The system may also include a gateway device operably connected to the work machine controller and a communication network, the gateway device being configured to receive data from the work machine controller. The gateway device may also be configured to add quality of service information to the received data. The gateway device may also be configured to transmit, based on the added quality of service information, the received data with the added quality of service information to the communication network.

In yet another exemplary embodiment, a method for providing reliable and secure communications between a work machine and one or more remote entities using a communication network may include operably connecting a gateway device to a work machine controller and a communication network. The method may further include receiving data from the work machine controller at the gateway device. The method may also include adding quality of service information to the received data. The method may also include transmitting, based on the added quality of service information, the received data with the added quality of service information to the communication network.

Yet another exemplary embodiment includes a work machine. The work machine may include a frame and a power source operably connected to the frame. The work machine may also include a work machine controller configured to control at least one operation of a work machine. The work machine may also include a gateway device operably connected to the work machine controller and a communication network, the gateway device being configured to receive data from the work machine controller. The gateway device may also be configured to add quality of service information to the received data. The gateway device may also be configured to transmit, based on the added quality of service information, the received data with the added quality of service information to the communication network.

DETAILED DESCRIPTION

Figure 1:
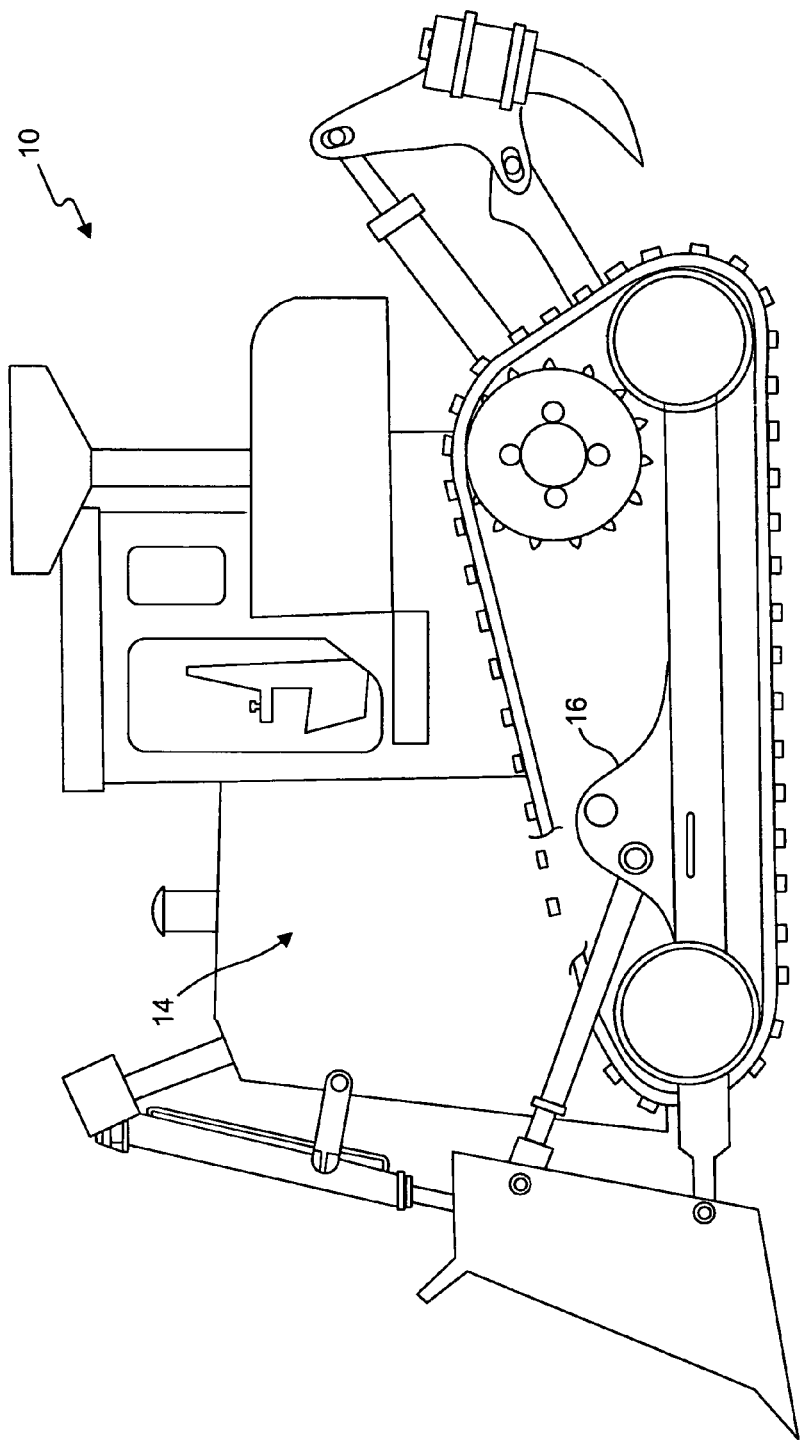
FIG. 1 is a pictorial representation of a work machine according to an exemplary disclosed embodiment.

FIG. 1 provides a pictorial illustration of work machine 10. While work machine 10 is shown as a track-type tractor, work machine 10 may include various other types of machines, such as, for example, an on-highway truck, an off-highway truck, an automobile, a dump truck, a stationary generator, a skid-steer, an air compressor, or any other such device that includes one or more machine components configured to respond to input commands from an operator.

Work machine 10 may include a power source 14 and frame 16. Power source 14 may include one or more devices configured to provide power for the operation of work machine 10. These devices may include, for example, an electric motor, an engine, a battery, etc. In an exemplary embodiment, power source 14 may include an engine, such as, for example, a diesel engine, a gasoline engine, a steam engine, etc. In addition, any other engine configurable to provide power for the operation of work machine 10 may be used as power source 14. Power source 14 may be operatively coupled to frame 16.

Figure 2:
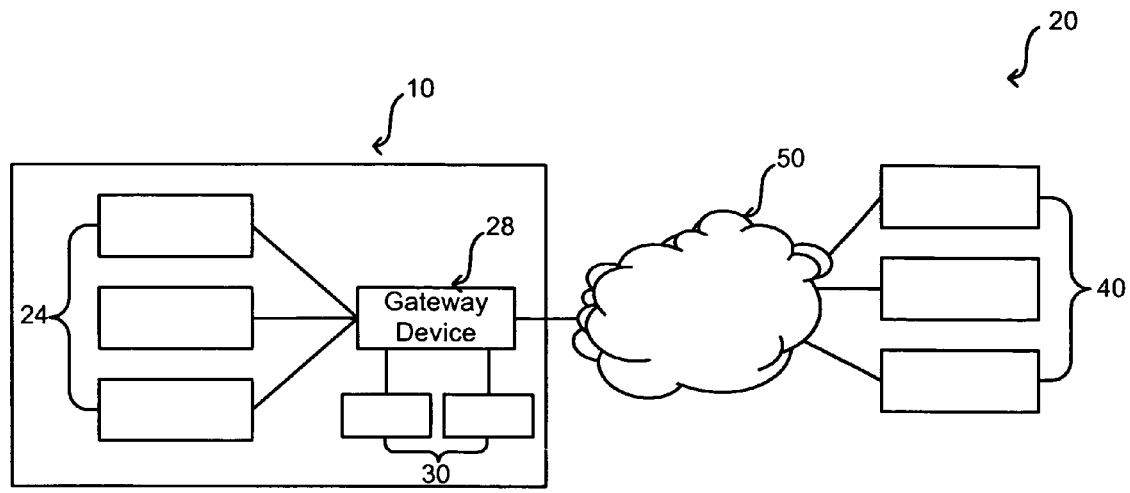
FIG. 2 is a block diagram representation of a secure communication system for a work machine according to an exemplary disclosed embodiment.

FIG. 2 is a block diagram representation of a secure communication system 20. System 20 may include a work machine 10. Work machine 10 may include one or more work machine controllers 24, a gateway device 28, and one or more electronic components 30. Work machine 10 may be configured to communicate with one or more remote entities 40 using a communication network 50. Specifically, work machine 10 may include one or more communication components (not shown) for establishing a communication link between work machine 10 and at least one of remote entities 40 via communication network 50. The one or more remote entities 40 may include another work machine, a base station, a monitoring station, and any other entity capable of exchanging information with work machine 10 over communication network 50.

Work machine controllers 24 may be configured to control one or more electronically controllable functions of work machine 10. These functions may include, for example, transmission control, payload control, hydraulics control, regeneration control, determining the location of work machine 10, etc. One or more work machine controllers 24 may need to exchange data with other devices on work machine 10 or devices that may be located at remote entities 40. For example, a work machine controller 24 that may be configured to determine the location of work machine 10 may need error correction information that may be transmitted by a device located at remote entity 40, such as, for example, a base station. Data may be exchanged between one or more work machine controllers 24 and remote entities 40 over communication network 50. However, it may be necessary to perform other functions, such as, for example, encrypting data, prioritizing data, compressing data, exchanging data according to quality of service parameters, and queuing data, prior to transmitting data across communication network 50.

Gateway device 28 may be configured to, among other things, exchange data between work machine controllers 24 and other devices on board work machine 10. In addition, gateway device 28 may also be configured to exchange data between work machine controllers 24 and remote entities 40 via communication network 50. Furthermore, gateway device 28 may be configured to perform functions, such as, for example, data encryption, data compression, data prioritization, data queuing, data transmission in accordance with quality of service ("QOS") information, etc. Specifically, gateway device 28 may be configured to perform these and other such functions by adding transmission information to data received from work machine controllers 24. This transmission information may be related to data encryption, data compression, data prioritization, data translation, data quality of service, and other such parameters.

Furthermore, gateway device 28 may be configured to provide for the connection of one or more electronic components 30 on board work machine 10. Electronic components 30 may include, for example, temperature sensors, pressure sensors, tire pressure monitors, Global Position System ("GPS") receivers, etc. In addition, any other component including electronics that may be used on board work machine 10 may be included as an electronic component 30. Additionally, gateway device 28 may also be configured as a firewall between electronic components 30 and work machine controllers 24, and also between communication network 50 and work machine controllers 24.

Communication network 50 may include any number of communication devices that may be used to exchange information between work machine 10 and remote entities 40. In some instances, communication network 50 may not be owned and operated by a user or manufacturer of work machine 10. The type of communication network 50 may depend on the type of communication devices included in communication network 50. In an exemplary embodiment, communication network 50 may include a geosynchronous earth orbit ("GEO") network, a low earth orbit ("LEO") network, a cellular network, a wireless Ethernet network, a wireless broadband network, or a wireless mesh network. In addition, any other communication network that is capable of providing connectivity between work machine 10 and one or more of remote entities 40 may be used as communication network 50.

A GEO network may include a plurality of satellites, each capable of providing connectivity between work machine 10 and at least one remote entity 40. A satellite that is part of a GEO network may connect to work machine 10 via one or more communication components, such as, for example, a GPS receiver that may be located on work machine 10. In addition, any other communication component may be used to provide connectivity between a GEO satellite and work machine 10. Similar connectivity may be provided between the GEO network and the one or more remote entities 40 that may connect to work machine 10 via the GEO network.

A LEO network may include a group of low earth orbiting satellites. The satellites in the LEO network may have a different orbital path than those in the GEO network. For example, in an exemplary embodiment, the satellites in the GEO network may be geostationary satellites, i.e., satellites orbiting the earth directly over the equator, at a height of approximately 22,000 miles. On the other hand, a LEO satellite may orbit the earth at an altitude of only a few hundred miles. Various satellite providers may provide network connectivity between work machine 10 and one or more remote entities 40. For example, a satellite provider, such as, for example, ORBCOMM, may be used to provide connectivity between work machine 10 and remote entities 40.

A cellular network may include a telecommunication network used to provide cell phone service and data service. Specifically, a cellular network may include cell phone towers that are used to relay phone conversations and messages from one cell phone subscriber to another. In addition, cell phone towers may also be configured to provide connectivity between work machine 10 and one or more remote entities 40. Cell phone towers may communicate with work machine 10 through one or more communication components, such as, for example, a cellular radio (not shown), that may be located on work machine 10. In addition, any other communication component capable of providing connectivity between a cellular network and work machine 10 may be used to connect work machine 10 to the cellular network. Similar connectivity may be provided between the cellular network and one or more remote entities 40. For example, if remote entity 40 is another work machine, then the other work machine may also include a cellular radio that connects the other work machine to the cellular network.

The cellular network may operate on 2G cellular standards, such as, for example, CDMA (Code Division Multiple Access), GSM (Global System for Mobile Communications), and TDMA (Time Division Multiple Access). Alternatively, or in addition, the cellular network may also operate on 2.5G and/or 3G standards, such as, for example, GPRS (General Packet Radio Service) and WCDM (Wideband Code Division Multiple Access). In addition, the cellular network may operate on any other cellular standard configurable to permit the exchange of information between work machine 10 and one or more remote entities 40 via the cellular network.

A wireless Ethernet network may include a computer network that provides wireless data connectivity between work machine 10 and one or more remote entities 40. The computer network may include routers, switches, servers, repeaters, multiplexers, wireless access points, and other such network devices that may be used to provide wireless data connectivity between work machine 10 and one or more remote entities 40. The wireless Ethernet network may connect to work machine 10 and remote entities 40 using communication components, such as, for example, wireless radios, wireless Ethernet transceivers, etc., that may be located on work machine 10 and remote entities 40. Different types of wireless Ethernet transceivers may be used to provide connectivity between work machine 10 and a wireless Ethernet network. For example, wireless Ethernet transceivers may operate at different frequencies and data rates, depending on the type of transceiver used. Specifically, work machine 10 may include an 802.11b transceiver that may operate at a frequency of 2.4 GHz and a data rate of up to 11 Mbps. Alternatively, work machine 10 may include an 802.11g transceiver that may operate at a frequency of 2.4 GHz and a data rate of up to 11 Mbps. In addition, other wireless Ethernet transceivers that may operate at other frequencies and data rates may be used to connect work machine 10 to a wireless Ethernet network.

A wireless broadband network includes a communication network that may provide greater coverage than a wireless Ethernet network. An example of a wireless broadband network is a Wi-Max ("Worldwide interoperability for Microwave access") network. Wi-Max may refer to any broadband wireless access network based on the new IEEE 802.16 standard. A Wi-Max network may include the capability of transmitting network signals over a larger area than a wireless Ethernet network. In addition, a Wi-Max network may transfer data at a faster rate than that of a wireless Ethernet network. In an exemplary embodiment, a Wi-Max network may provide a data rate of 70 Mbps. Work machine 10 and remote entities 40 may connect to a wireless broadband network using one or more communication components, such as, for example, wireless transceivers, wireless radios, etc., that may be compatible with the IEEE 802.16 standard.

A wireless mesh network may include, among other devices, a network of wireless radios (also known as "rovers") that may also be configured as wireless routers to provide network connectivity between work machine 10 and remote entities 40. Specifically, work machine 10 may connect to a wireless radio in the wireless mesh network that, in addition to providing wireless connectivity to work machine 10, determines the wireless access point that is the closest to work machine 10. Based on this information, the wireless radio may transfer the data received from work machine 10 to a wireless access point, or to another wireless radio that lies en route to the wireless access point. Thus, the use of a wireless mesh network may obviate the need of having a direct connection between work machine 10 and a wireless access point.

One skilled in the art will appreciate that the types of communication networks described above are exemplary in nature only. As other types of communication networks become available and capable of transferring information between work machine 10 and remote entities 40, they may also be used to provide connectivity between work machine 10 and remote entities 40. Furthermore, any combination of communication networks may also be used to connect work machine 10 to remote entities 40. For example, a combination of a wireless Ethernet network and a wireless broadband network may be used to increase the possible reach of communication network 50.

Work machine controller 24 may represent one or more devices that may be configured to control the operations of work machine 10. In an exemplary embodiment, work machine controller 24 may include devices, such as, for example, an engine controller module, a regeneration controller module, a transmission controller module, a hydraulics control module, a payload controller module, or any other device capable of controlling at least one operation of work machine 10.

In an exemplary embodiment, work machine controller 24 may be configured to control knocking in an engine. "Knocking" is uncontrolled fuel combustion detrimental to emissions, fuel economy, and engine longevity. Alternatively, work machine controller 24 may include a regeneration controller to control the "regeneration" of an exhaust element in an exhaust system of a work machine. Regeneration is the process of heating the particulate matter trapped in an exhaust element to a temperature at which the particulate matter combusts or vaporizes.

In yet another instance, work machine controller 24 may be configured to control the kind of braking system used in work machine 10. Specifically, work machine 10 may include multiple braking systems such as, for example, a service brake system, an engine brake system, an exhaust brake system, and a transmission braking system. Depending on the need and the regulations specific to the work site, an operator may be authorized to use only some of the braking systems available on work machine 10. For example, environmental regulations prevalent at a work site may prevent the use of an engine brake in a work machine 10. Work machine controller 24 may therefore be configured to control the type of braking system that may be used on work machine 10, depending on the location of work machine 10. In addition, work machine controller 24 may be configured to control other such operations of work machine 10.

Work machine controller 24 may include components suitable for carrying out various operations for work machine 10. These components may include, for example, a memory (not shown) and a CPU (not shown), I/O modules (not shown), and any other component needed to run a program file. Furthermore, work machine controller 24 may need data to perform its various functions. This data may include information, such as, for example, the regeneration duration for a particulate trap, the desired air-to-fuel ratio in the engine, the engine speed at which the engine in work machine 10 may operate, the type of braking system work machine 10 may use, error correction data to eliminate errors while determining the position of work machine 10, etc. In an exemplary embodiment, a portion of the data may be stored in the memory of work machine controller 24. Work machine controller 24 may be configured to receive a portion of the data it uses to control the operation of work machine 10 from remote entities 40 via gateway device 28 that is connected to communication network 50.

In addition, work machine controller 24 may also transmit data to remote entities 40 via communication network 50. For example, if work machine controller 24 is operating as a payload controller, it may send a signal to a remote entity 40, such as, for example, a monitoring station, when the payload on work machine 10 exceeds a certain limit. In addition, or alternatively, if work machine controller 24 is configured to determine the position of work machine 10, work machine controller 24 may need to send this information to remote entity 40, such as, for example, another work machine. In addition, work machine controller 24 may need to send other such information to one or more remote entities 40. Work machine controller 24 may send such information to remote entities 40 via gateway device 28 that is connected to communication network 50.

Gateway device 28 may include one or more devices configurable to, among other things, exchange information between work machine controller 24 and one or more remote entities 40 through communication network 50. In addition, gateway device 28 may include one or more devices configurable to exchange information between a plurality of work machine controllers 24 that are connected to gateway device 28. While the disclosed embodiment discloses work machine controllers 24 and gateway device 28 as physically separate units, the functions of at least one work machine controller 24 and gateway device 28 may be integrated into one physical unit.

In an exemplary embodiment, gateway device 28 may operably connect to one or more work machine controllers 24 using one or more connection means. These means may include wired connections, wireless connections, or any other means for connecting gateway device 28 to work machine controller 24. Wired connections may include copper, optical fiber, or other such connections. Gateway device 28 may communicate with one or more work machine controllers 24 using one or more communication protocols. These communication protocols may include datalink protocols and wireless protocols. Datalink protocols may include, for example, J1939, Ethernet, SAEJ1587, RS-232, RS-422, RS-485, or other such protocols. Wireless protocols may include, for example, 802.11b, 802.11g, and other such protocols. In addition, other communication protocols that may be used to facilitate communication between gateway device 28 and one or more work machine controllers 24 may also be used.

Gateway device 28 may also connect to communication network 50 using one or more communication means. The type of communication means may depend on the type of communication network 50. For example, if communication network 50 is a cellular network, gateway device 28 may connect to a cellular radio via a serial connection, such as, for example, an RS-232 connection. Gateway device 28 may also connect to a satellite network, such as, for example, a LEO or a GEO network, using a serial connection. On the other hand, if communication network 50 is a wireless network, such as a Wi-Fi network, a wireless broadband network, a wireless mesh network, or any other such network, then gateway device 28 may connect to such networks using an Ethernet connection, such as, for example, an 802.11b adapter, an 802.11g adapter, etc. Alternatively, if communication network 50 is an Ethernet network, then gateway device 28 may connect to communication network 50 using a RJ-45 connection.

During the exchange of data between work machine controllers 24 and remote entities 40 through communication network 50, gateway device 28 may transfer the data from a communication port connected to work machine controllers 24 to a communication port connected to communication network 50 and vice versa. In addition, this exchange of information may be based on transmission information related to the data being exchanged. Specifically, gateway device 28 may receive data from work machine controller 24 that is destined to one or more remote entities 40. Upon receipt of this data, gateway device 28 may add transmission information, such as QOS information, that may be used to transmit the received data across communication network 50 to one or more remote entities 40.

In addition, gateway device 28 may perform some functions on at least a portion of the data received from work machine controller 24, prior to transmitting the data to communication network 50. These functions may include data encryption, data compression, and data prioritization. In addition, gateway device 28 may also perform other functions, such as, for example, acting as a firewall for data being exchanged between work machine controllers 24 and communication network 50, consolidating data before transmitting the data on to communication network 50, encapsulating data being transferred onto communication network 50 in a transmission unit consistent with a communication protocol being used on communication network 50, translating data from one data type to another, etc.

Gateway device 28 may include a software application to perform, among other things, the above-mentioned functions. This software application may be written in a computing language, such as, for example, C, C++, Pascal, Visual C++, or Visual Basic, etc. Furthermore, gateway device 28 may include a CPU, RAM, I/O modules, any other component needed to run the software application. In an exemplary embodiment, all the components of gateway device 28 may be integrated into one physical unit to perform the operations noted above. In another exemplary embodiment, gateway device 28 may include two or more separate components that may be configured to perform the above-mentioned operations.

Figure 3:
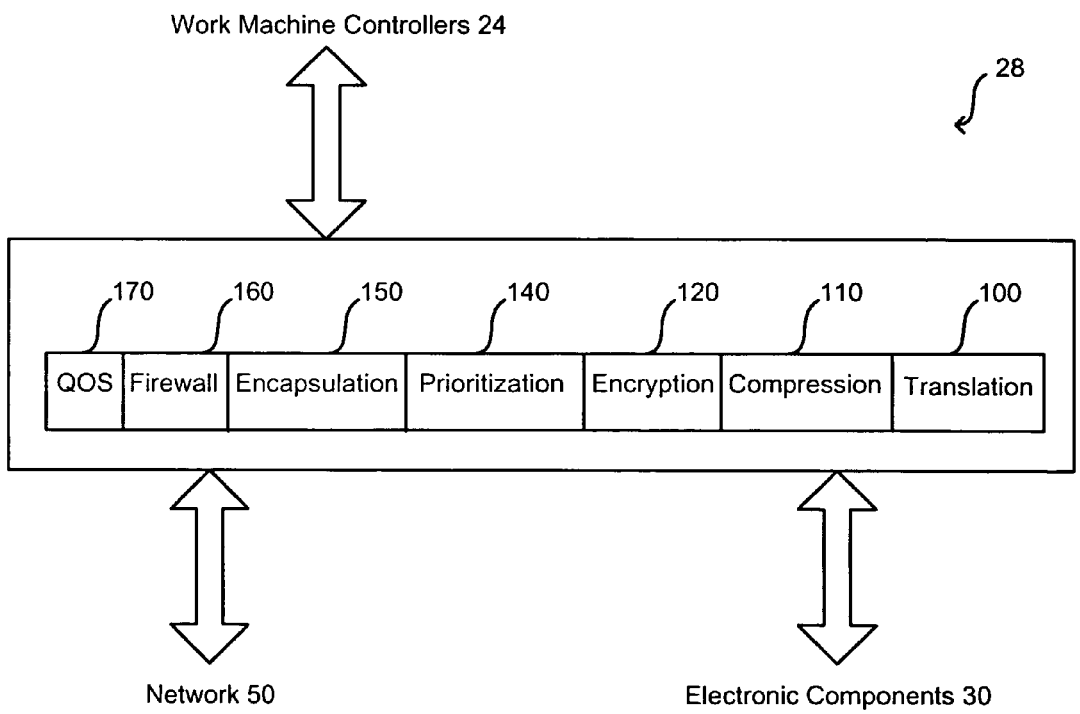
FIG. 3 is a functional block diagram representation of a gateway device used in a secure communication system of a work machine according to an exemplary disclosed embodiment.

FIG. 3 provides a functional block diagram representation of the various functions that may be performed by gateway device 28. Gateway device 28 may perform data translation (100), data compression (110), data encryption (120), data prioritization (140), data encapsulation (150), firewall functions (160), and QOS (170) functions. Gateway device 28 may perform at least a portion of these functions by adding transmission information to data received from work machine controllers 24. In an exemplary embodiment, this transmission information may include QOS information. Gateway device 28 may perform similar functions that may be related to data received from communication network 50. For example, gateway device 28 may perform data decryption (not shown), data decompression (not shown), or data decapsulation (not shown) on data received from communication network 50.

Gateway device 28 may be configured to translate data being exchanged between work machine controllers 24 and remote entities 40 via communication network 50 as part of its data translation function 100. This translation may occur from one data type to another. In an exemplary embodiment, this translation may occur from one communication protocol to another. For example, gateway device 28 may connect to a work machine controller 24 via a datalink connection, such as, for example, a J1939 connection. A controller (not shown) on remote entity 40 may connect to a gateway device (not shown) on remote entity 40 via a different data link connection, such as, for example, an Ethernet connection. Thus, gateway device 28 may receive data originating from the remote controller that includes Ethernet datalink packets. On receipt of this data from communication network 50, gateway device 28 may translate this data from Ethernet protocol to J1939 protocol so that the received data may be transmitted to work machine controller 24 using the J1939 datalink connection. Gateway device 28 may also translate data from one communication protocol to another prior to transmitting the data on to communication network 50. Thus, for example, if gateway device 28 receives data from work machine controller 24 on a J1939 connection, that is destined to a remote controller that only includes an Ethernet connection, then gateway device 28 may translate the data from J1939 to Ethernet prior to sending the data on to communication network 50.

In another exemplary embodiment, the data types may be different units of measurement. Specifically, gateway device 28 may be configured to translate data from one unit of measurement to another. For example, a controller on remote entity 40 may send payload information in metric units, such as, for example, kilograms. However, work machine controller 24 may only be configured to use information in English units, such as, for example, pounds. In such an instance, gateway device 28 may be configured to perform a units conversion of data received from the remote controller from kilograms to pounds before transmitting the information received from the remote controller to work machine controller 24. In addition, gateway device 28 may perform other types of data translations in order to facilitate the exchange of data between work machine controllers 24 and remote entities 40. The translation functions of gateway device 28 may be performed by the software application included in gateway device 28. Specifically, the software application in gateway device 28 may use generic or special designed algorithms to perform such translations.

Gateway device 28 may also perform a data compression function 110. This function may be desirable for various reasons. In some instances, the maximum attainable data rate between gateway device 28 and communication network 50 may be slower than the rate at which gateway device 28 receives data from one or more work machine controllers 24. For example, work machine controllers 24 may connect to gateway device 28 via a Fast Ethernet connection of 100 Mbps, but gateway device 28 may connect to communication network 50 via a T1 connection of 1.5 Mbps. It may therefore be desirable for gateway device 28 to compress the data received from work machine controller 24 before transferring the data to communication network 50. Gateway device 28 may use various data compression techniques, such as, for example, Run length encoding, Huffman coding, Arithmetic coding, LZ-77 coding, etc., in order to compress data being transferred on to communication network 50. In addition, gateway device 28 may add transmission information to the compressed data that may, for example, indicate to a receiving device associated with remote entity 40, the type of compression technique used by gateway device 28 to compress the data. This transmission information may be, for example, in the form of header information added to the data packets that are compressed by gateway device 28. The receiving device may use the transmission information for, among other things, determining the technique it may use to decompress the data upon receipt of the data from communication network 50. In addition, the transmission information may include any other information that may be used for the transfer of the compressed data across communication network 50.

In some instances, it may be desirable to secure the communications between work machine 10 and remote entities 40 across communication network 50. For example, if communication network 50 is owned and/or operated by a party unrelated to the manufacturer or user of work machine 10, security concerns may cause a need to encrypt the data prior to its transmission across communication network 50. Gateway device 28 may use various encryption techniques, such as, for example, public key encryption, secret key encryption, etc., to encrypt the data received from work machine controllers 24 prior to transmitting the data across communication network 50. Some public key encryption techniques may include Diffie-Hellman, RSA, and Digital Signature Algorithm (DSA). Some secret key encryption techniques may include, for example, Data Encryption Standard (DES) and the International Data Encryption Algorithm (IDEA). In addition, gateway device 28 may use other encryption techniques in order to encrypt data being transmitted across communication network 50 to one or more remote entities 40.

Gateway device 28 may also add transmission information to the encrypted data that may, among other things, be used by a receiving device associated with remote entities 40 to determine the authenticity of the data received by the receiving device. For example, the added transmission information may be in the form of a digital signature sent by gateway device 28 along with the encrypted information. This digital signature, when decrypted by the receiving device, may help the receiving device verify that the data received by the receiving device originated from an authentic source, i.e., gateway device 28. In addition, the transmission information may be used to perform other functions that may facilitate the encryption and decryption of data being transferred across communication network 50.

Gateway device 28 may also be configured to add transmission information to data received from work machine controllers 24 in order to route information between controllers that do not use a communication protocol compatible with that used by gateway device 28. For example, gateway device 28 may use a communication protocol, such as, for example, Internet Protocol ("IP"), to route information from one communication port on gateway device 28 to another. However, one or more work machine controllers 24 may be unable to transmit data including IP information to gateway device 28. In order to facilitate the routing of such information, gateway device 28 may add transmission information related to IP, such as, for example, IP addresses, to the data received from one or more work machine controllers 24. Based on this transmission information, gateway device 28 may route the data from one communication port to the other. Gateway device 28 may also include information, such as, for example, routing tables (tables that map destination addresses to communication ports on gateway device 28) to facilitate the routing of such data.

Gateway device 28 may be further configured to prioritize time critical information over noncritical information being transferred over communication network 50. Specifically, gateway device 28 may be configured to prioritize transmission of at least a portion of the data received from one or more work machine controllers 24 in accordance with a transmission priority. Based on this transmission priority, gateway device 28 may prioritize time-critical data over noncritical data by buffering noncritical data in memory buffers (not shown) upon receipt of such data from work machine controllers 24. Thus, while gateway device 28 may transmit time-critical data as soon as it is received from work machine controllers 24, gateway device 28 may queue noncritical data until a time, for example, when there is no time-critical information to be sent. This queuing may be carrier out in memory buffers located in a memory unit (not shown) associated with gateway device 28. Alternatively, any other data prioritization technique may be used in order to ensure the timely transmission of time-critical information. The transmission priority may include information, such as, for example, priority tags, that may indicate to gateway device 28 whether the information is time critical. Thus, for example, a priority tag of "1" may indicate to gateway device 28 that the data received is time critical, whereas a priority tag of "0" may indicate that the data is not time critical and, therefore, may be queued for transmission at a later time. In addition, the transmission priority may include other information that may facilitate the prioritization of data being transmitted by gateway device 28 over communication network 50.

In some instances, gateway device 28 may be configured to transmit data using a communication protocol that may differ from the communication protocol being used by communication network 50. In these instances, gateway device 28 may also be configured to encapsulate the data received from work machine controllers 24 into a transmission unit consistent with the communication protocol used by communication network 50. Similarly, gateway device 28 may be configured to decapsulate data received from communication network 50 into a transmission unit consistent with the communication protocol used by gateway device 28. This encapsulation and decapsulation may be performed by a software and/or a hardware component of gateway device 28. For example, a hardware component, such as an adapter that is part of gateway device 28, may be used to encapsulate and decapsulate data being exchanged across communication network 50. In an exemplary embodiment, if gateway device 28 is configured to transmit data using IP packets, and communication network 50 is a cellular network using GPRS technology, then a software and/or a hardware component of gateway device 28 may be configured to encapsulate IP packets being transmitted from gateway device 28 into GPRS packets in order to enable the transmission of data across the cellular network. In addition, gateway device 28 may be configured to encapsulate and decapsulate data in any other manner suitable for transmission of data across communication network 50.

It may be desirable to protect components on work machine 10 from harmful data, such as, for example, corrupt data, unwanted data, viruses, etc. Therefore, gateway device 28 may also be configured to operate as a firewall between work machine controllers 24 and communication network 50. In addition, gateway device 28 may also be configured to operate as a firewall between work machine controllers 24 and one or more electronic components 30. Electronic components 30 may include, for example, a GPS receiver, a tire pressure sensor, a payload sensor, a temperature sensor, a pressure sensor, a regeneration sensor, etc. In addition, any other device that may be used in any electronically controllable operation of work machine 10 may form part of electronic components 30.

While operating as a firewall, gateway device 28 may be configured to use different criteria to secure work machine controllers 24 and other portions of work machine 10 from communication network 50 and electronic components 30. These criteria may include, for example, the allowable data bandwidth between gateway device 28 and communication network 50 and also between gateway device 28 and electronic components 30, the communication ports on gateway device 28 that may be accessible via communication network 50, the number of work machine controllers 24 that may be accessible via gateway device 28, etc. For example, a user may configure gateway device 28 such that the data transmission rate between gateway device 28 and communication network 50 is capped at, for example, 500 kbps, instead of the maximum permissible rate of, for example, 1 Mbps. In addition, if certain work machine controllers 24, such as, for example, payload controllers, are more susceptible to receiving corrupt data from communication network 50 due to conditions, such as, for example, a network event, then gateway device 28 may be configured so that all access to the payload controller through communication network 50 may be blocked for a time period configurable by a user. In addition, other criteria that may facilitate the securing of components on work machine 10 from harmful data may also be used to operate gateway device 28 as a firewall. The firewall function in gateway device 28 may be configured using a software component, a hardware component, or any combination thereof in gateway device 28.

Gateway device 28 may need to transfer some portions of data in a manner such that the data transmission rates, error rates, and other characteristics can be, to some extent, guaranteed in advance. This may also be known as QOS. Gateway device 28 may be configured to transmit data using different types of QOS. Specifically, different types of data may require different types of data transmission guarantees that may, in part, depend on the nature of the data being transmitted. For example, some data being transmitted by gateway device 28 over communication network 50 may be time sensitive in nature. This data may include, for example, location-related error-correction information being exchanged between work machine controller 24 and a remote entity 40. This type of time-critical information may have to be transmitted by gateway device 28 upon immediate receipt from work machine controller 24 or remote entity 40. Furthermore, because of the time-sensitive nature of such information, it may be feasible for gateway device 28 to retransmit such information a number of times without waiting for an acknowledgement of receipt of such information from the receiving device. The transmission of such type of information may form a type of QOS.

Yet another type of QOS may exist for data that is time dependent, such that a late delivery of such data may be meaningless. Such data may include, for example, the current position of work machine 10. Therefore, gateway device 28 may be configured to transmit such data for a predetermined number of times while waiting for an acknowledgement, but give up transmitting the data if no acknowledgement is received within a predetermined time. Another type of QOS may exist for data that may have to be transmitted under all circumstances, irrespective of the number of times gateway device 28 may have to transmit such data. Thus, gateway device 28 may have to continue to transmit this data until gateway device 28 receives an acknowledgement of receipt of such data from the receiving device. This data may include critical information, such as, for example, payload information of work machine 10. In an exemplary embodiment, a payload controller on work machine 10 may have to transmit information pertaining to the amount of payload on work machine 10 to remote entities 40. Based on the information received from work machine 10, remote entities 40 may then transfer data such as, brake control data, to work machine 10, thus leading to a safe operation of work machine 10.

Gateway device 28 may be configured to use a QOS-related software to transmit and receive data as per the QOS associated with that data. One such software may be TMAC. TMAC is a software that may be used to transmit User Datagram Protocol ("UDP") data packets as per the QOS associated with the data. The QOS associated with the data may be determined based on the QOS information added to data received from one or more work machine controllers 24 by gateway device 28. This QOS information may be added in a TMAC packet 200.

Figure 4:
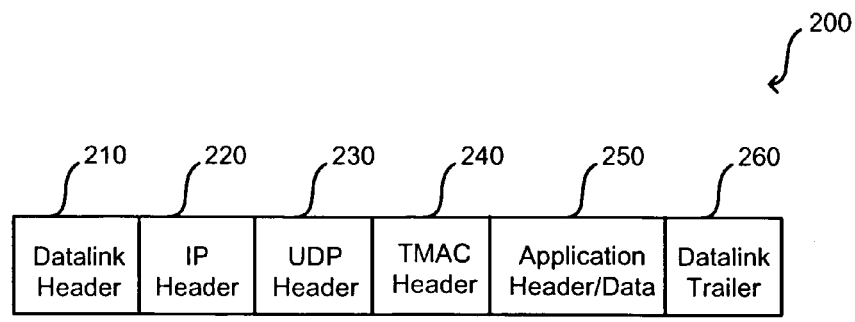
FIG. 4 represents a TMAC packet according to an exemplary disclosed embodiment.

FIG. 4 is a block diagram representation of a TMAC packet 200. TMAC packet 200 may include a datalink header 210, an IP header 220, a UDP header 230, a TMAC header 240, an application header/data 250, and a datalink trailer 260. TMAC header 240 may include QOS information associated with the data. This QOS information may be added by gateway device 28 to data received from work machine controllers 24. Gateway device 28 may be configured to use different criteria while determining the type of QOS information to add to data received from work machine controllers 24. In an exemplary embodiment, gateway device 28 may add QOS information in TMAC header 240 based on the type of work machine controller 24 from which gateway device 28 receives data. Thus, if gateway device 28 receives data from a work machine controller 24 that operates as a payload controller, gateway device 28 may be configured to add QOS information indicating that the data received from the controller needs to be transmitted until an acknowledgement of receipt is received from the receiving device. Alternatively, if gateway device 28 receives information from a work machine controller 24 that operates as a position-determining device, then gateway device 28 may add QOS information to this data indicating that the data should only be transmitted for a set period of time, after which gateway device 28 should no longer transmit such data. In addition, other criteria that may facilitate the transmission of data as per the associated QOS may also be used by gateway device 28 to add QOS information to TMAC header 240.

Figure 5A:
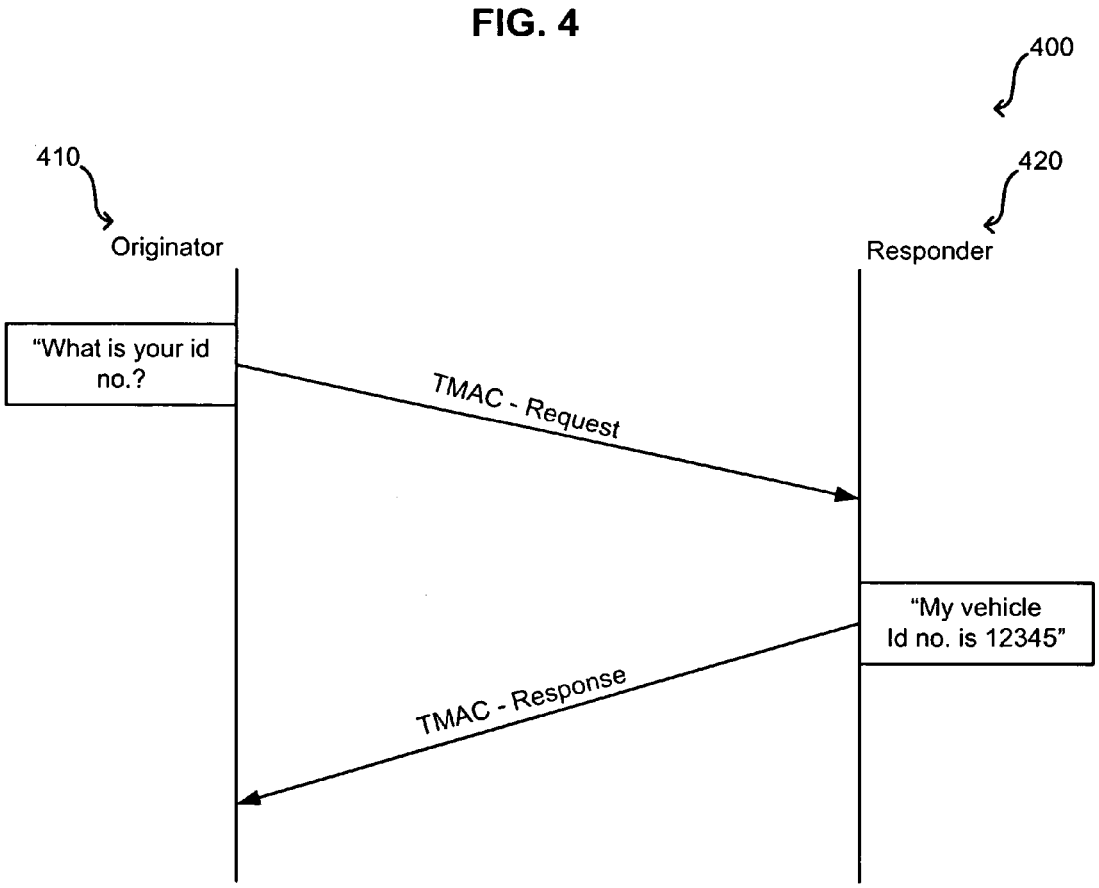
FIG. 5a represents a flow model for data transfer according to an exemplary disclosed embodiment.

FIG. 5a represents an exemplary data flow model 400 for data transfer using the TMAC application. Data flow model 400 may represent a model for data transfer, where an originator 410 may use its TMAC application to request a responder 420 to perform a specific action and return the status. In addition, or alternatively, originator 410 may use its TMAC application to request responder 420 to return a specific piece of information using its TMAC application. For example, originator 410 may send a TMAC-request including a request, such as, for example, "what is your vehicle id. no.?," to responder 420. In an exemplary embodiment, originator 410 may include a transmitting device, such as, for example, gateway device 28. Responder 420 may include, for example, a communication device on a remote entity 40. If originator 410 determines that the information requested in the TMAC-request message is not particularly important, the QOS information included in TMAC header 240 may indicate that originator 410 may refrain from sending any retransmissions and, may also not expect an acknowledgement in response to its request. Thus, based on the QOS information included in TMAC header 240, originator 410 may refrain from retransmitting the message. Responder 420 may respond with a TMAC-response message including a response such as, for example, "my vehicle id. no. is 12345."

Figure 5B:
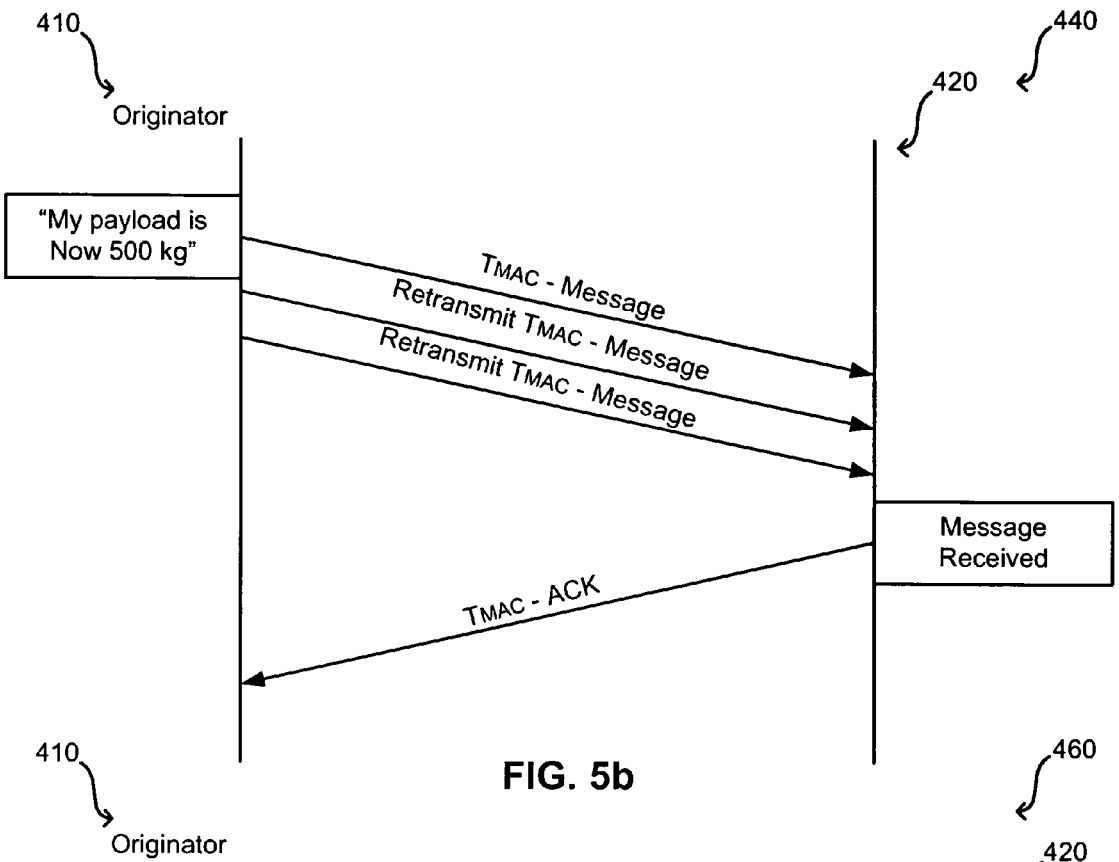
FIG. 5b represents a flow model for data transfer according to an alternative exemplary disclosed embodiment.

FIG. 5b represents an alternative exemplary data flow model 440 for data transfer using the TMAC application that uses the TMAC message-ack scenario. Originator 410 may send critical information in a TMAC-message. For example, originator 410 may send payload related information, such as, for example, "My payload is now 500 kg." Because this may be considered as critical information, QOS information stored in TMAC header 240 may indicate that originator 410 should keep retransmitting this information until originator 410 may receive an acknowledgement from responder 420. Thus, based on QOS information stored in TMAC header 240, originator 410 may keep retransmitting this information until an acknowledgement is received. Responder 420 may send an acknowledgement acknowledging receipt of this information in a TMAC-ack message.

Figure 5C:
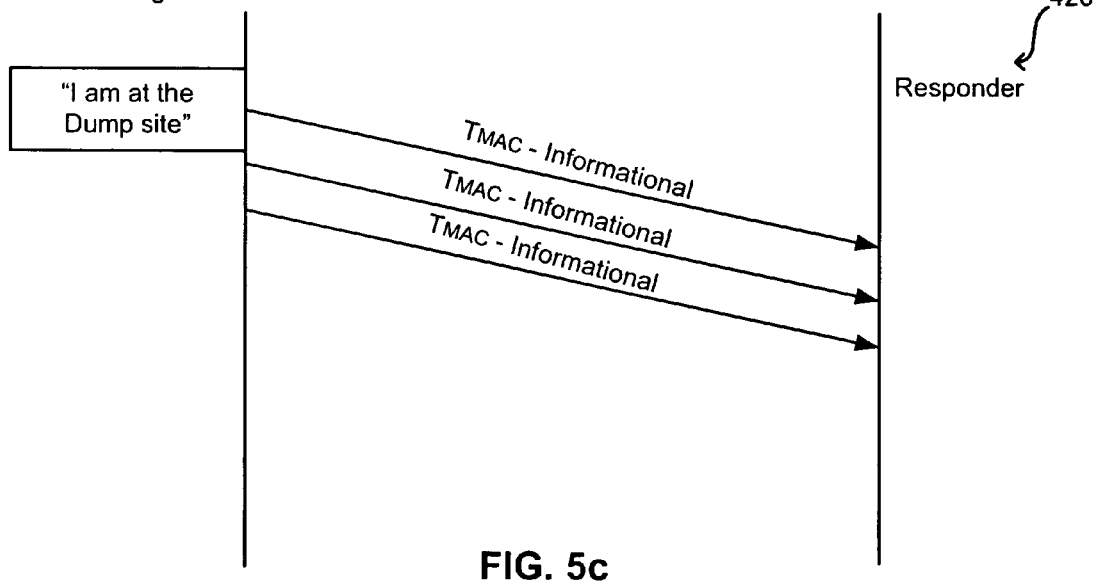
FIG. 5c represents a flow model for data transfer according to an alternative exemplary disclosed embodiment.

FIG. 5c represents an alternative exemplary data flow model 460 for data transfer using the TMAC application that uses the TMAC message-informational scenario. Data flow model 460 may be used when originator 410 may want to communicate a piece of information, such as, for example, work machine 10 position information, that is time dependent, i.e., late delivery of such information is meaningless. The QOS information in TMAC header 240 may include information that indicates that originator 410 should only transmit the information a predetermined number of times (e.g., five times). The QOS information may further indicate that if no acknowledgement is received from responder 420, then originator 410 should stop transmitting the information to responder 420 upon reaching the predetermined transmission limit. Based on this QOS information, originator 410 may send a TMAC-informational message to responder 420. If originator 410 does not receive an acknowledgement from responder 420 after a predetermined number of transmissions, originator 410 will no longer attempt to send the information. In addition, other types of flow models that may facilitate the exchange of information between originator 410 and responder 420 based on QOS information may also be used.

One skilled in the art will appreciate that gateway device 28 may perform other functions in addition to those shown in FIG. 3. For example, gateway device 28 may also be configured to consolidate data received from one or more work machine controllers 24 before sending the data on to communication network 50. In an exemplary embodiment, rather than transmitting a coolant temperature information on an hourly basis to remote entities 40, gateway device 28 may use, for example, software running on gateway device 28, to consolidate this information into a histogram including twenty-four data points. Gateway device 28 may then transmit the histogram only at the end of a twenty four hour period over communication network 50 to one or more remote entities 40.

In an exemplary embodiment, gateway device 28 may be configured to reorder at least a portion of the data received from communication network 50. For example, if data is transferred over communication network 50 using multiple data packets, gateway device 28 may be configured to reorder out-of-order data packets received from communication network 50. Gateway device 28 may receive out-of-order data packets from communication network 50 due to various reasons. These reasons may include, for example, disruptions in service on communication network 50, work machine 10 going out of the coverage area of communication network 50, etc. Each received data packet may include sequence information that may indicate the sequence in which the data was transmitted through communication network 50 and, correspondingly, the correct sequence in which the data packet should have been received by gateway device 28. The software and/or hardware components in gateway device 28 may be configured to reorder the out-of-order data packets received from communication network 50 based on the sequence information included in the received data. In addition, gateway device 28 may perform other functions that may facilitate the exchange of data between work machine 10 and remote entities 40.

One skilled in the art will also appreciate that the order in which the functions performed by gateway device 28 are described are exemplary only, and gateway device 28 may perform the functions in any suitable order. For example, gateway device 28 may perform data encryption 120 before data compression 110, data compression 110 before data translation 100, etc.

INDUSTRIAL APPLICABILITY

The disclosed embodiments may be useful for facilitating communications between components on any work machine. In addition, the disclosed embodiments may also be useful for facilitating communications between a work machine and one or more remote entities that may connect to the work machine through a communication network. These embodiments may provide improvements over existing work machine communication systems and methods. For example, there may be instances where a work machine may need to transmit and receive some data with a higher priority over the other data. The disclosed system, by prioritizing the transmission of data in accordance with a transmission priority, may enable a work machine to prioritize the transmission of time-critical data across the communication network.

The disclosed system may also enable the exchange of different types of data between a work machine and remote entities as per the QOS related to the data. Thus, the disclosed system may enable a work machine to distinguish between data that needs to be sent by a reliable mechanism, such as, for example, using acknowledgements, from data that may not need a reliable mechanism for delivery. This transmission of data as per QOS information associated with the data may lead to the more efficient use of bandwidth over a communication network. This is because the use of reliable data delivery mechanisms for the transmission of all data may decrease the efficiency of data transmission across a communication network. Thus, by sending only a portion of the data using a reliable delivery mechanism, the disclosed system increases the efficiency of data communication over a communication network.

Furthermore, the disclosed system may operate as a firewall between a set of electronic components on board a machine and electronic controllers on the work machine. In addition, the disclosed system may also operate as a firewall between electronic controllers on the work machine and the communication network connected to the work machine. By providing this firewall capability on board the work machine, the disclosed system may secure the work machine based on criteria, such as, for example, bandwidth usage, communication port type, etc., from unwanted data.

In addition, because of the nature of information being exchanged between a machine and remote entities, there may be a need to secure the communications between the machine and these remote entities. For example, because a machine may communicate to remote entities using a communication network that may not be owned and operated by a user of the work machine, certain information being communicated, such as, for example, position information and software upgrade information, may need to be encrypted before it is sent on to the third-party network. By providing for the encryption of data before transferring the data over a communication network, the disclosed system may secure the communications between the work machine and remote entities over the communication network.

It will be apparent to those skilled in the art that various modifications and variations can be made in the disclosed QOS-based work machine communication system and method. Additionally, other embodiments of the disclosed system will be apparent to those skilled in the art from consideration of the specification. It is intended that the specification and the examples be considered exemplary only, with a true scope of the disclosure being indicated by the following claims and their equivalents.

What is claimed is:

1. A system to provide reliable and secure communications between a machine that is powered by a fuel driven engine and that has a transmission system and a hydraulics system, and one or more remote entities using a communication network, the system comprising:
    a controller configured to control at least one operation of the machine, the at least one operation including controlling at least one of the transmission system or the hydraulics system;
    a gateway device operably connected to the controller and the communication network, the gateway device being configured to:
        receive data from the controller;
        determine a type of the data received from the controller based on an evaluation of content of the received data;
        determine a type of quality of service information to add to the received data based on the type of received data in order to provide in advance a characteristic associated with transfer of the data;
        add the type of quality of service information to the received data, the type of quality of service information including instructions on at least one of:
            whether the received data is to be retransmitted after an initial transmission;

a number of times the received data is to be transmitted retransmitted if retransmission of the received data is instructed; and whether an acknowledgement of receipt of the data by a receiving device is to be waited for; and transmit the received data to the communication network using software that includes the type of quality of service information with UDP data packets.

2. The system of claim 1, wherein the gateway device is further configured to encrypt at least a portion of the data received from the controller and transmit the encrypted data to the communication network.

3. The system of claim 1, wherein the gateway device is further configured to compress at least a portion of the data received from the controller and transmit the compressed data to the communication network.

4. The system of claim 1, wherein the gateway device is further configured to:

prioritize transmission of at least a portion of the data received from the controller in accordance with a transmission priority; and transmit the data in accordance with the transmission priority.

5. The system of claim 1, wherein the gateway device is further configured to:

receive data from the communication network, wherein the data received from the communication network includes information related to a sequence of transmission of the received data through the communication network; and reorder at least a portion of the received data based on the sequence information included in the received data.

6. The system of claim 1, wherein the gateway device is configured to transfer data using a first protocol and the communication network is configured to transfer data using a second protocol, and wherein the gateway device is further configured to:

encapsulate the data received from the controller within a transmission unit consistent with the second protocol;

transmit the encapsulated data to the communication network;

decapsulate data received from the communication network into a transmission unit consistent with the first protocol; and transmit the decapsulated data to the controller.

7. The system of claim 1, wherein the gateway device is further configured to operably connect to an electronic component on board the machine.

8. The system of claim 7, wherein the gateway device is further configured to operate as a firewall between the controller and at least one of the communication network and the electronic component.

9. The system of claim 1, wherein the gateway device is further configured to consolidate at least a portion of the data received from the controller and transmit the consolidated data to the communication network.

10. The system of claim 1, wherein the gateway device is further configured to translate at least a portion of the data received from at least one of the controller and the communication network from a first data type to a second data type.

11. The system of claim 10, wherein the first data type is associated with a first communication protocol and the second data type is associated with a second communication protocol.

12. The system of claim 1, wherein the communication network includes at least one of a geosynchronous earth orbit ("GEO") network, a low earth orbit ("LEO") network, a cellular network, a wireless Ethernet network, a wireless broadband network, and a wireless mesh network.

13. A method for providing reliable and secure communications between a machine that is powered by a fuel driven engine having and that has a transmission system and a hydraulics system, and one or more remote entities using a communication network, the method comprising:

operably connecting a gateway device to a controller and the communication network;

controlling at least one operation of the machine using the controller, the at least one operation including controlling at least one of the transmission system or the hydraulics system;

receiving data from the controller at the gateway device;

determining a type of the data received from the controller based on an evaluation of content of the received data;

determining a type of quality of service information to add to the received data based on the type of received data in order to provide in advance a characteristic associated with transfer of the data;

adding the type of quality of service information to the received data, the type of quality of service information including instructions on at least one of:

whether the received data is to be retransmitted after an initial transmission;

a number of times the received data is to be retransmitted if retransmission is instructed; and whether an acknowledgement of receipt of the data by a receiving device is to be waited for; and transmitting the received data to the communication network using software that includes the type of quality of service information with UDP data packets.

14. The method of claim 13, further including encrypting at least a portion of the data received from the controller and transmitting the encrypted data to the communication network.

15. The method of claim 13, further including compressing at least a portion of the data received from the controller and transmitting the compressed data to the communication network.

16. The method of claim 13, further including:

prioritizing transmission of at least a portion of the data received from the controller in accordance with a transmission priority; and transmitting the data in accordance with the transmission priority.

17. The method of claim 13, further including the gateway device transferring data using a first protocol and the communication network transferring data using a second protocol.

18. The method of claim 17, further including:

encapsulating the data received from the controller within a transmission unit consistent with the second protocol;

transmitting the encapsulated data to the communication network;

decapsulating data received from the communication network into a transmission unit consistent with the first protocol; and transmitting the decapsulated data to the controller.

19. The method of claim 13, further including the gateway device operably connecting to an electronic component on board the machine.

20. The method of claim 19, further including the gateway device operating as a firewall between the controller and at least one of the communication network and the electronic component.

21. The method of claim 13, further including consolidating at least a portion of the data received from the controller and transmitting the consolidated data to the communication network.

22. A machine comprising:
- a power source, the power source being one of a fuel driven engine or an electric motor;
- a transmission system;
- a hydraulics system;
- a controller configured to control at least one operation of the machine, the at least one operation including controlling at least one of the transmission system and the hydraulics system;
- a gateway device operably connected to the controller and a communication network, the gateway device being configured to:
  - receive data from the controller;
  - determine a type of data received from the controller based on an evaluation of content of the received data;
  - determine a type of quality of service information to add to the received data based on the type of received data in order to provide in advance a characteristic associated with transfer of the data;
  - add the type of quality of service information to the received data, the type of quality of service information including instructions on at least one of:
    - whether the received data is to be retransmitted after an initial transmission;
    - a number of times the received data is to be transmitted retransmitted if retransmission is instructed; and
    - whether an acknowledgement of receipt of the data by a receiving device is to be waited for; and
  - transmit the received data to the communication network using software that includes the type of quality of service information with UDP data packets.

23. The machine of claim 22, wherein the gateway device is further configured to encrypt at least a portion of the data received from the controller and transmit the encrypted data to the communication network.

24. The machine of claim 22, wherein the gateway device is further configured to compress at least a portion of the data received from the controller and transmit the compressed data to the communication network.

25. The machine of claim 22, wherein the gateway device is further configured to operably connect to an electronic component on board the machine.

26. The machine of claim 25, wherein the gateway device is further configured to operate as a firewall between the controller and at least one of the communication network and the electronic component.

* * * * *

UNITED STATES PATENT AND TRADEMARK OFFICE
CERTIFICATE OF CORRECTION

Page 1 of 1

PATENT NO.         : 8,756,331 B2
APPLICATION NO.    : 11/311279
DATED              : June 17, 2014
INVENTOR(S)        : Moughler et al.

It is certified that error appears in the above-identified patent and that said Letters Patent is hereby corrected as shown below:

In the Claims

Column 17, lines 1-2, in Claim 1, delete "transmitted retransmitted" and insert -- retransmitted --.

Column 18, line 5, in Claim 13, delete "engine having and" and insert -- engine and --.

Column 20, lines 3-4, in Claim 22, "transmitted retransmitted" and insert -- retransmitted --.

Signed and Sealed this
Fifteenth Day of September, 2015

Michelle K. Lee
*Director of the United States Patent and Trademark Office*